(12) United States Patent
Phan Huy et al.

(10) Patent No.: US 12,068,834 B2
(45) Date of Patent: Aug. 20, 2024

(54) SELECTION METHOD FOR OPTIMIZING COMMUNICATIONS BY AMBIENT BACKSCATTERING, AND ASSOCIATED SYSTEM

(71) Applicant: ORANGE, Issy les Moulineaux (FR)

(72) Inventors: Dinh Thuy Phan Huy, Chatillon (FR); Romain Fara, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 326 days.

(21) Appl. No.: 17/769,542

(22) PCT Filed: Oct. 7, 2020

(86) PCT No.: PCT/FR2020/051763
§ 371 (c)(1),
(2) Date: Apr. 15, 2022

(87) PCT Pub. No.: WO2021/074504
PCT Pub. Date: Apr. 22, 2021

(65) Prior Publication Data
US 2023/0044921 A1    Feb. 9, 2023

(30) Foreign Application Priority Data
Oct. 16, 2019  (FR) ..................................... 1911552

(51) Int. Cl.
*H04B 7/145*  (2006.01)
*H04L 27/00*  (2006.01)

(52) U.S. Cl.
CPC ......... *H04B 7/145* (2013.01); *H04L 27/0012* (2013.01)

(58) Field of Classification Search
CPC .......... H04B 5/77; H04B 1/40; H04B 7/0413; H04B 7/22; H04B 1/10; H04B 5/72;
(Continued)

(56) References Cited

U.S. PATENT DOCUMENTS 10,763,990 B1 *  9/2020  Vougioukas .............. H04L 5/14
2022/0077886 A1 *  3/2022  Yan ................... G06K 19/07336
(Continued)

FOREIGN PATENT DOCUMENTS

EP    3349302 A1    7/2018
FR    3099670 A1    2/2021

OTHER PUBLICATIONS

N. Van Huynh et al., "Ambient Backscatter Communications: A Contemporary Survey", in IEEE Communications Surveys & Tutorials, vol. 20, No. 4, pp. 2889-2922, arXiv:1712.04804v1, Dec. 13, 2017.

(Continued)

*Primary Examiner* — Golam Sorowar
(74) *Attorney, Agent, or Firm* — David D. Brush; Westman, Champlin & Koehler, P.A.

(57) ABSTRACT

A method for selection by an ambient backscatter system including a source as well as transmitting and receiving devices, the source being associated with a precoder for focusing signals towards the devices. Furthermore, the method includes, for a plurality of values $\phi_1, \ldots, \phi_N$: a phase-shift, by the source, of one of the components of the precoder according to the value $\phi_i$, so as to obtain a precoder $Q_i$; an emission, by the source, using the precoder $Q_i$; an acquisition, by the receiving device, of power measurements during non-backscattering and backscattering states, a determination, by the receiving device, of a value $D1_i$ representative of a power deviation between the measurements. The method also includes a selection, by the receiving device, of a maximum value among the values $D1_1, \ldots, D1_N$.

13 Claims, 3 Drawing Sheets

(58) Field of Classification Search
CPC ........ H04B 1/525; H04B 1/18; H04B 7/0617;
H04B 7/26; H04B 13/005; H04B 5/79;
H04B 1/1081; H04B 1/0003; H04B
1/0064; H04B 17/318; H04B 5/00; H04B
1/04; H04B 1/0475; H04B 1/1027; H04B
1/12; H04B 1/50; H04B 1/69; H04B
1/713; H04B 1/7143; H04B 10/548;
H04B 14/008; H04B 17/309; H04B
2001/6912; H04B 2215/067; H04B 5/45;
H04W 4/80; H04W 72/0466; H04W
88/08; H04W 4/70; H04W 52/0203;
H04W 72/0453; H04W 74/0808; H04W
84/12; H04W 24/02; H04W 24/10; H04W
4/35; H04W 48/16; H04W 52/0225;
H04W 52/225; H04W 52/24; H04W
52/245; H04W 52/246; H04W 52/281;
H04W 52/38; H04W 52/42; H04W 52/46;
H04W 72/542; H04W 16/30; H04W
4/023; H04W 4/40; H04W 52/0229;
H04W 52/146; H04W 52/16; H04L
27/2602; H04L 27/36; H04L 5/0048;
H04L 27/0008; H04L 27/10; H04L
27/2626; H04L 27/3405; H04L 5/0007;
H04L 25/0204; H04L 25/0224; H04L
25/4902; H04L 27/00; H04L 27/0012;
H04L 27/04; H04L 27/066; H04L 27/20;
H04L 27/2042; H04L 27/26; H04L
27/2601
See application file for complete search history.

(56) References Cited

U.S. PATENT DOCUMENTS

2022/0174676 A1\* 6/2022 Huang .............. H04W 72/0453
2022/0286171 A1    9/2022 Fara et al.

OTHER PUBLICATIONS

K. Rachedi et al., "Demo Abstract : Real-Time Ambient Backscatter Demonstration", IEEE INFOCOM 2019 Posters and Demos, May 1, 2019, Paris, France.
English machine translation of French Written Opinion dated Jun. 9, 2020 for corresponding French Application No. 1911552, filed Oct. 16, 2019.
International Search Report dated Dec. 14, 2020 for corresponding International Application No. PCT/FR2020/051763, Oct. 7, 2020.
Written Opinion of the International Searching Authority dated Dec. 14, 2020 for corresponding International Application No. PCT/FR2020/051763, filed Oct. 7, 2020.
French Search Report and Written Opinion dated Jun. 9, 2020 for corresponding French Application No. 1911552, filed Oct. 16, 2019.
Guo Huayan et al., "Exploiting Multiple Antennas for Cognitive Ambient Backscatter Communication", IEEE Internet of Things Journal, IEEE, USA, vol. 6, No. 1, Feb. 1, 2019 (Feb. 1, 2019), pp. 765-775, XP011711636.
Van Huynh Nguyen et al., "Ambient Backscatter Communications: A Contemporary Survey", IEEE Communications Surveys & Tutorials, vol. 20, No. 4, dated 2018, pp. 2889-2922, XP011698260.
English translation of the Written Opinion of the International Searching Authority dated Jan. 20, 2021 for corresponding International Application No. PCT/FR2020/051763, filed Oct. 7, 2020.

\* cited by examiner

SELECTION METHOD FOR OPTIMIZING COMMUNICATIONS BY AMBIENT BACKSCATTERING, AND ASSOCIATED SYSTEM

CROSS-REFERENCE TO RELATED APPLICATIONS

This Application is a Section 371 National Stage Application of International Application No. PCT/FR2020/051763, filed Oct. 7, 2020, which is incorporated by reference in its entirety and published as WO 2021/074504 A1 on Apr. 22, 2021, not in English.

FIELD OF THE DISCLOSURE

The present invention belongs to the general field of telecommunications. It relates more particularly to a selection method implemented by an ambient backscatter communication system, said selection relating to one or several values representative of an electromagnetic power useful to the operation of a receiving device belonging to said system. It also relates to a communication method implemented by said system. The invention finds a particularly advantageous application, although in no way limiting, for applications of the "Internet of Things" or IoT type.

BACKGROUND OF THE DISCLOSURE

Ambient backscatter technology is well known today. The technical principles on which this technology is based are described, in particular, in the document of N. Van Huynh et al. entitled "Ambient Backscatter Communications: A Contemporary Survey", in IEEE Communications Surveys & Tutorials, vol. 20, No. 4, pp. 2889-2922, Fourthquarter 2018.

Conventionally, the backscattering of an ambient signal takes place between at least one transmitting device and at least one receiving device occupying fixed respective positions.

The concerned ambient signal corresponds to a radio signal emitted, either permanently or recurrently, by at least one source in a given frequency band. For example, it can be a television signal, a mobile phone signal (3G, 4G, 5G), a Wi-Fi signal, a WiMax signal, etc.

To communicate with a receiving device, a transmitting device utilizes the ambient signal to send data to said receiving device. More particularly, the transmitting device reflects the ambient signal towards the receiving device, possibly by modulating it. The signal thus reflected is called "backscattered signal", and is intended to be decoded by the receiving device.

The fact that no additional radio wave (in the sense of a wave other than that resulting from the ambient signal) is emitted by the transmitting device makes the ambient backscatter technology particularly attractive. Indeed, the energy cost of a communication is thus optimized, which is in particular important within the current context of the IoT where each object of everyday life is intended to become a communicating object.

To implement this technology, the transmitting device is configured to receive the ambient signal, but also to backscatter it (state called "backscattering" state) or not (state called "non-backscattering" state) towards the receiving device. The receiving device, for its part, is configured to decode the signal possibly backscattered by the transmitting device.

That being said, and in practice, this decoding can only be implemented if the variation in electromagnetic power received by the receiving device, between times when the transmitting device is in the non-backscattering and backscattering states respectively, exceeds a determined threshold, called "power threshold". Indeed, if this power threshold is not reached, the receiving device is not able to detect that the transmitting device is in a backscattering state, and therefore does not implement any decoding (essentially for reasons of preservation of its energy autonomy).

The existence of such a power threshold, in addition to the fact that the transmitting and receiving devices occupy fixed positions, however, proves to be problematic in ensuring effective communication between said devices.

Indeed, the transmitting and receiving devices are generally positioned in a complex propagation environment comprising elements (walls, trees, ground, etc.) capable of generating reflections and diffractions of waves emitted by the source. Thus, and schematically, two types of signals reach the receiving device: the backscattered signal, the only carrier of data useful for the implementation of the ambient backscattering, as well as a signal coming directly from the source called "interfering signal" and resulting from multiple reflections/diffractions of waves (by "directly", it is meant here waves not derived from the backscattered signal).

Insofar as the interfering signal does not convey data useful for the implementation of the ambient backscattering (only the data conveyed by the backscattered signal are intended to be decoded), it is therefore perceived as "pollution» on the side of the receiving device. This consideration with regard to the interfering signal is further reinforced by the fact that the latter can combine in an uncontrolled manner with the backscattered signal, thus possibly altering the level of electromagnetic power that can be received, in theory and on the only base of the backscattered signal, by the receiving device.

Consequently, said receiving device is conventionally configured to perform processing operations aimed at canceling, upon receipt, any contribution of the interfering signal to the total received signal (i.e. the sum of the backscattered signal and of the interfering signal). Such a configuration of the receiving device is nevertheless problematic insofar as it is complex to implement (electronics as well as dedicated algorithmic processing operations), and therefore necessarily expensive to deploy. Furthermore, it does not allow taking advantage, at the receiving device, of the electromagnetic power conveyed by the waves of the interfering signal. Reaching said power threshold can therefore be compromised, thus preventing effective communication between the transmitting and receiving devices.

SUMMARY

The present invention aims to overcome some of the drawbacks of the prior art, in particular those set out above, by proposing a solution which allows limiting, on the receiving device side and with respect to the solutions of the prior art, the complexity of implementation of an ambient backscatter communication.

In addition, the present invention also aims to propose a solution that allows maximizing the level of electromagnetic power received by a receiving device, so as to make it easier to reach said power threshold, and thus improving the decoding of the data transmitted via a backscattered signal.

The ambient backscatter communication between a transmitting device and a receiving device is thus made more efficient.

To this end, and according to a first aspect, the invention relates to a selection method implemented by an ambient backscatter communication system including an emitting source as well as a transmitting device and a receiving device, the source being associated with a focusing precoder P including a first and a second component for focusing signals towards respectively the transmitting device and the receiving device. Furthermore, said method includes, for a value $\phi\_i$ comprised in the interval $[0, 2\pi]$:

- a step of phase-shifting, by the source, one of the components of the precoder P according to said value $\phi\_i$, so as to obtain a precoder $Q\_i$,
- a step of emission, by the source, using said precoder $Q\_i$,
- a step of acquiring, by the receiving device, a first measurement and a second measurement of electromagnetic power when the transmitting device is respectively in a non-backscattering state and in a backscattering state,
- a step of determining, by the receiving device, a value $D1\_i$ representative of a power deviation, in absolute value, between said first and second measurements, said phase-shift, emission, acquisition and determination steps being iterated for a plurality of values $\phi\_1, \ldots, \phi\_N$ distinct from each other, the method further including a step of selecting, by the receiving device, a maximum value, called "intermediate optimum value", among the determined values $D1\_1, \ldots, D1\_N$.

Correlatively, the invention also relates to an emission method implemented by an emitting source intended for an ambient backscatter communication system, said system also including a transmitting device and a receiving device, the source being associated with a focusing precoder P including a first and a second component for focusing signals towards respectively the transmitting device and the receiving device. Said emission method includes, for a value $\phi\_i$ comprised in the interval $[0, 2\pi]$:

- a step of phase-shifting one of the components of the precoder P according to said value $\phi\_i$, so as to obtain a precoder $Q\_i$,
- a step of emission using said precoder $Q\_i$.

In one particular mode of implementation of said emission method, said phase-shift and emission steps are iterated for a plurality of values $\phi\_1, \ldots, \phi\_N$ distinct from each other.

Correlatively, the invention also relates to another selection method implemented by a receiving device intended for an ambient backscatter communication system, said system also including an emitting source as well as a transmitting device, the source being associated with a focusing precoder P including a first and a second component for focusing signals towards respectively the transmitting device and the receiving device. Said other selection method includes:

- during an emission by the source using a precoder $Q\_i$ obtained by said source by phase-shifting of one of the components of the precoder P according to a value $\phi\_i$ comprised in the interval $[0, 2\pi]$, a step of acquiring a first measurement and a second measurement of electromagnetic power when the transmitting device is respectively in a non-backscattering state and in a backscattering state,
- a step of determining a value $D1\_i$ representative of a power deviation, in absolute value, between said first and second measurements, said acquisition and determination steps being iterated for a plurality of values $\phi\_1, \ldots, \phi\_N$ mutually distinct from each other, said other selection method further including a step of selecting, by the receiving device, a maximum value, called "intermediate optimum value", among the determined values $D1\_1, \ldots, D1\_N$.

Thus, in accordance with said selection method implemented by the ambient backscatter communication system (and therefore also in accordance with said emission method implemented by the source and with said other selection method implemented by the receiving device), it is proposed to modulate the phase of one of the components of the focusing precoder P. Therefore, this amounts to modulating the phase of the signal emitted towards the receiving device and intended to be backscattered, or to modulating the phase of the interfering signal which is not backscattered. In any event, the selection method according to the invention therefore allows varying the phase difference between the backscattered signal and the interfering signal.

Thereby varying said phase difference between the backscattered and interfering signals, via the consideration of said values $\phi\_i$, allows increasing the combinations that can be envisaged between these signals at the receiving device. In other words, and contrary to the solutions of the prior art, rather than seeking to cancel any contribution of the interfering signal on the receiving device side, the selection method according to the invention allows taking advantage of the energy conveyed by said interfering signal by seeking the phase-shift value leading to an advantageous combination of this signal with the backscattered signal.

By "advantageous combination", reference is made here to a combination that allows maximizing the variation in electromagnetic power received by the receiving device, between times when the transmitting device is in the non-backscattering and backscattering states respectively. Maximizing this power variation makes it easier to reach the power threshold, so as to improve the decoding of the data transmitted by backscattering.

In addition, within the framework of the present invention, the emitting source is configured to execute processing operations aimed at phase-shifting the focusing precoder. The receiving device, for its part, also performs processing operations aimed at acquiring at least two levels of electromagnetic power, via said first and second power measurements, and at determining power deviations based on these measurements. Such processing operations are much simpler to implement than those aimed at canceling a contribution from the interfering signal on the receiving device side. These are processing operations requiring few calculations and which can be implemented thanks to less complex electronics than that of the solutions of the prior art. This therefore optimizes, at a lower cost, the efficiency of the ambient backscatter communication between the transmitting device and the receiving device.

In particular modes of implementation, the selection method implemented by the ambient backscatter communication system (and therefore also said emission method implemented by the source and said other selection method implemented by the receiving device) may further include one or several of the following characteristics, taken individually or in all technically possible combinations.

In particular modes of implementation, said phase-shift, emission, acquisition and determination steps are iterated as long as the value $D1\_i$ determined during a determination step for a value $\phi\_i$ is lower than a predetermined threshold.

Proceeding in this way allows limiting the number of iterations, and therefore a fortiori limiting the time devoted to performing said iterations. The computing resources of the receiving device as well as of the source are therefore preserved.

In particular modes of implementation, said phase-shift, emission, acquisition and determination steps are iterated a determined number of times.

Proceeding in this way offers the possibility of obtaining with certainty as much value D1_i as the number of performed iterations. Also, the greater the number of iterations, the greater the maximum value among the values D1_1, . . . , D1_N determined, and therefore the greater the probability that at least one of said values is associated with a deviation greater than the power threshold required for the decoding of backscattered data.

In particular modes of implementation, the values $\phi\_1, \ldots, \phi\_N$ are sampled on a logarithmic scale or on a linear scale.

In particular modes of implementation, the precoder P is of the zero forcing type or of the Minimum Mean Square Error type.

In particular modes of implementation, said method further includes, before the implementation of the phase-shift, emission, acquisition and determination steps, at least one step of updating, by the source, the precoder P, the updated precoder P corresponding to the precoder P whose first and second components are weighted respectively by strictly positive first coefficient and second coefficient forming a pair of coefficients, and the phase-shift step being applied to said updated precoder P.

Such dispositions allow modifying the distribution of electromagnetic power transmitted by the source towards each of the transmitting and receiving devices, for example based on external information concerning the propagation environment of the communication system. In this way, it is possible to take into account the propagation conditions between the source and the transmitting and receiving devices, and therefore to improve the relevance of an intermediate optimum value obtained according to the invention.

In particular modes of implementation, a plurality of update steps is considered, the pairs of first and second coefficients considered during said update steps being distinct from each other, the set of steps formed of:

the iterations of the phase-shift, emission, acquisition and determination steps for the values $\phi\_1, \ldots, \phi\_N$, and the step of selecting an intermediate optimum value, being iterated for each of the considered update steps, so that each update step corresponds to an intermediate optimum value, said method further including a step of selecting, by the receiving device, a maximum value, called "final optimum value", among said intermediate optimum values.

Proceeding in this way allows seeking for a power distribution, between the first and second components of the precoder P, which maximizes the variation in electromagnetic power received by the receiving device, between times when the transmitting device is in the non-backscattering and backscattering states respectively. Such an implementation, called "first optimum mode", is even more advantageous in that it therefore comprises two degrees of optimization of such a variation, namely an optimization according to phase-shift values as well as an optimization according to said power distribution.

In particular modes of implementation, for a given update step, the first coefficient is equal to a value $\delta$, where $\delta$ is chosen from the interval [0,1], and the second coefficient is equal to $\sqrt{1-\delta^2}$.

In particular modes of implementation, said method includes, after the step of selecting said intermediate optimum value, a step of transmitting, by the receiving device and towards the source, information identifying the precoder, called "intermediate optimum precoder" Q, based on which said intermediate optimum value was determined, said method further including, for a pair C_m of first and second strictly positive coefficients:

a step of updating, by the source, the precoder Q, the updated precoder Q corresponding to the precoder Q whose first and second components are weighted by said first and second coefficients respectively, a step of emission, by the source, using said updated precoder Q, a step of acquiring, by the receiving device, a first measurement and a second measurement of electromagnetic power when the transmitting device is respectively in a non-backscattering state and in a backscattering state, a step of determining, by the receiving device, a value D2_m representative of a power deviation, in absolute value, between said measurements, said update, emission, acquisition and determination steps considered for a pair of coefficients being iterated for a plurality of pairs C_1, . . . , C_M of coefficients distinct from each other, the method further including a step of selecting, by the receiving device, a maximum value, called "final optimum value", among the determined values D2_1, . . . , D2_M.

Such an implementation, called "second optimum mode", forms an alternative to said first optimum mode mentioned above, and inherits the same advantages as those attached thereto.

According to a second aspect, the invention relates to a communication method implemented by an ambient backscatter communication system including at least one emitting source as well as a transmitting device and a receiving device, the source being associated with a focusing precoder P including a first and a second component for focusing signals towards respectively the transmitting device and the receiving device. Furthermore, said communication method includes:

a step of obtaining an intermediate optimum value or a final optimum value selected according to a selection method in accordance with the invention, a step of transmitting, by the receiving device and towards the source, information identifying the precoder, called "optimized precoder", based on which said intermediate optimum value/final optimum value was determined, a step of emitting, by the source, an ambient signal using said optimized precoder, a step of backscattering, by the transmitting device, said ambient signal, a step of receiving, by the receiving device, the backscattered ambient signal.

Such a communication method inherits the same advantages as those attached to the selection method according to the invention.

Thus, once an optimized precoder has been identified, the source is emitting using said optimized precoder. Consequently, the efficiency of the communication established between the transmitting and receiving devices is greatly improved, since the probability that the power threshold is at least reached is much greater than in the case of the solutions of the prior art.

In particular modes of implementation, the obtaining, transmission, sending, backscatter and receiving steps are iterated recurrently.

Such dispositions allow taking into account the variability of the environment in which the transmitting device and the receiving device are positioned.

According to a third aspect, the invention relates to a computer program including instructions for the implementation of at least part of a selection method according to the invention or at least part of a communication method according to the invention when said program is executed by at least one computer.

According to a fourth aspect, the invention relates to a computer-readable recording medium on which a computer program according to the invention is recorded.

According to a fifth aspect, the invention relates to an ambient backscatter communication system including an emitting source as well as a transmitting device and a receiving device, the source being associated with a focusing precoder P including a first and a second component for focusing signals towards respectively the transmitting device and the receiving device. In addition, said source includes:

- a phase-shifting module, configured to phase-shift, for a value $\phi\_i$ comprised in the interval $[0, 2\pi]$, one of the components of the precoder P according to said value $\phi\_i$, so as to obtain a precoder $Q\_i$,
- means for emission using said precoder $Q\_i$, and said receiving device includes:

- acquisition means, configured to acquire electromagnetic power measurements,
- a determination module, configured to determine, from two acquired measurements, a value representative of a power deviation between said two acquired measurements,
- a selection module, configured to select, when several values have been determined, a maximum value among said determined values.

Correlatively, the invention also relates to an emitting source intended for an ambient backscatter communication system, said system also including a transmitting device and a receiving device, the source being associated with a focusing precoder P including a first and a second component for focusing signals towards respectively the transmitting device and the receiving device. In addition, said source includes:

- a phase-shifting module, configured to phase-shift, for a value $\phi\_i$ comprised in the interval $[0, 2\pi]$, one of the components of the precoder P according to said value $\phi\_i$, so as to obtain a precoder $Q\_i$,
- means for emission using said precoder $Q\_i$.

Correlatively, the invention also relates to a receiving device intended for an ambient backscatter communication system, said system also including an emitting source as well as a transmitting device, the source being associated with a focusing precoder P including a first and a second component for focusing signals towards respectively the transmitting device and the receiving device. Said receiving device includes:

- acquisition means, configured to acquire electromagnetic power measurements,
- a determination module, configured to determine, from two acquired measurements, a value representative of a power deviation between said two acquired measurements,
- a selection module, configured to select, when several values have been determined, a maximum value among said determined values.

In particular embodiments, the receiving device further includes a transmission module, configured to transmit towards the source information identifying a precoder based on which said maximum value was determined.

BRIEF DESCRIPTION OF THE DRAWINGS

Other characteristics and advantages of the present invention will emerge from the description given below, with reference to the appended drawings which illustrate an exemplary embodiment without any limitation. On the figures.

DETAILED DESCRIPTION OF ILLUSTRATIVE EMBODIMENTS

Figures 1, 2:
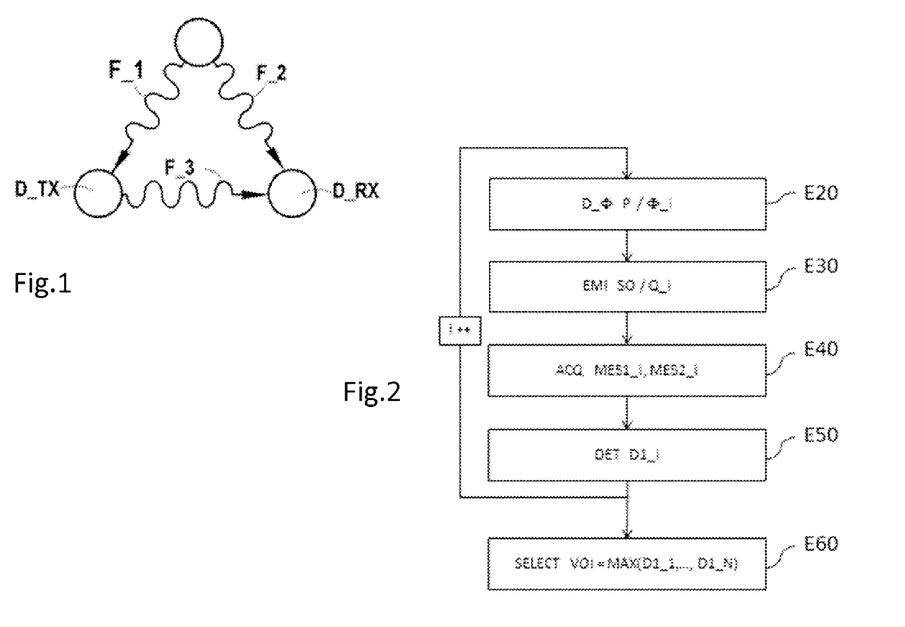
FIG. 1 schematically represents one particular embodiment of an ambient backscatter communication system according to the invention.
FIG. 2 represents, in the form of a flowchart, the main steps of a mode of implementation of a selection method according to the invention.

FIG. 1 schematically represents, in its environment and in a particular mode of implementation, an ambient backscatter communication system 10 according to the invention.

The communication system 10 includes an emitting source SO equipped with a plurality of antennas and configured to emit, in a frequency band called "emission band" and via said antennas, a radioelectric signal called "ambient signal". The emission of the ambient signal is for example performed permanently or recurrently.

For the remainder of the description, and as illustrated by FIG. 1, the case where the ambient signal is only emitted by one source is considered without any limitation. The choice consisting in considering a single source is made here for the sake of simplification of the description only. Also, no limitation is attached to the number of sources that can be considered within the framework of the present invention, the following developments being indeed generalizable without difficulty by those skilled in the art to the case of a plurality of sources.

By "radioelectric signal", reference is made here to an electromagnetic wave propagating by wireless means, the frequencies of which are comprised in the traditional spectrum of the radioelectric waves (ranging from a few hertz to several hundred gigahertz).

The remainder of the description relates more specifically, but without any limitation, to an ambient 4G mobile phone signal emitted in the emission band [811 MHz, 821 MHz].

It should however be specified that the invention remains applicable to other types of radioelectric signals, such as for example a mobile phone signal other than 4G (for example 2G, 3G, 5G), a Wi-Fi signal, a WiMax signal, a DVB-T signal, etc. In general, those skilled in the art know how to determine which emission signals can be considered for the source SO according to the modes of implementation envisaged and detailed below.

The communication system 10 also includes a transmitting device D_TX and a receiving device D_RX respectively configured in order to communicate with each other by ambient backscatter from the ambient signal emitted by the source SO.

In the remainder of the description, and as illustrated in FIG. 1, it is considered in a non-limiting manner that the communication system 10 comprises a single transmitting device D_TX and a single receiving device D_RX. It should however be specified that the invention is also applicable to a communication system comprising a plurality of transmitting devices and/or a plurality of emitting devices, the developments necessary for such a generalization being able to be implemented without difficulty by those skilled in the art.

In a manner known per se, the ambient backscatter communication consists of the utilization of the ambient signal, by the transmitting device D_TX, to send data towards said receiving device D_RX. More particularly, the transmitting device D_TX (respectively the receiving device D_RX) is configured to perform, from the ambient signal (respectively from the backscattered signal), processing operations aimed at backscattering said ambient signal (respectively aimed at decoding said backscattered signal), by implementing a backscattering method (respectively a decoding method).

For this purpose, the transmitting device D_TX (respectively the receiving device D_RX) includes for example one or several processors and storage means (magnetic hard disk, electronic memory, optical disk, etc.) in which data and a computer program are stored, in the form of a set of program code instructions to be executed to implement the backscattering method (respectively the decoding method).

Alternatively or in addition, the transmitting device D_TX (respectively the receiving device D_RX) also includes one or several programmable logic circuits, of the FPGA, PLD, etc. type, and/or specialized integrated circuits (ASIC), and/or a set of discrete electronic components, etc. adapted to implement the backscattering method (respectively the decoding method).

In other words, the transmitting device D_TX (respectively the receiving device D_RX) includes a set of means configured in a software (specific computer program) and/or a hardware (FPGA, PLD, ASIC, etc.) way to implement the backscattering method (respectively the decoding method).

The specific aspects concerning the emission of data by backscattering intended for the receiving device D_RX, as well as those concerning the decoding techniques implemented thereby, are known to those skilled in the art and depart from the framework of the present invention. Consequently, they are not detailed here further.

The waves conveyed by the signals considered in the present invention are represented conceptually by wavy arrows in FIG. 1. More particularly, the arrows F_1 and F_2 represent waves of the ambient signal emitted by the source SO. The waves represented by the arrow F_1 are backscattered by the transmitting device D_TX, and the waves of the backscattered signal are here represented by the arrow F_3. The waves represented by the arrow F_2 for their part are not backscattered and reach the receiving device D_RX directly (i.e. these are the waves conveyed by the interfering signal mentioned above). Only the waves represented by the arrow F_3 carry the data that the receiving device D_RX is intended to decode.

It should be noted that FIG. 1 is given for illustrative purposes only. Thus, for example, it does not include any element likely to reflect or diffract the waves of the ambient signal. In this sense, FIG. 1 is intended to be a simplified version of the environment in which the transmitting D_TX and receiving D_RX devices are located. It should nevertheless be kept in mind that this environment is generally of a complex configuration and includes, in practice, elements (walls, trees, ground, etc.) able to generate such reflections and diffractions.

In the present embodiment, the transmitting device D_TX is equipped with an antenna (not represented in the figures) configured, in a manner known per se, to receive the ambient signal but also to backscatter it towards the receiving device D_RX. It should be noted that no limitation is attached to the number of antennas with which the transmitting device D_TX can be equipped.

In practice, the transmitting device D_TX is associated with a frequency band, called "influence band", which corresponds to the frequency band in which the antenna is able to receive/backscatter signals. When said influence band is included in the emission band associated with the source SO, it is referred to as "working band". By "working band", reference is made here to the fact that the transmitting device D_TX is compatible with the source SO, therefore namely that the backscattering can be performed for any frequency comprised in said working band.

However, nothing excludes considering an influence band that is not included in the emission band. It is nevertheless implicit that for the transmitting device D_TX to be able to backscatter the ambient signal, said influence band should have a non-empty intersection with said emission band, the working band therefore corresponding to this intersection.

The transmitting device D_TX is also associated with operating states, namely a state called "backscattering" state (the transmitting device D_TX backscatters the ambient signal) as well as a contrary state called "non-backscattering" state (the transmitting device D_TX is transparent to the ambient signal). These states correspond to configurations in which said antenna is connected to distinct impedances. It is typically a positive even zero impedance, in the case of a backscattering state, and conversely a theoretically infinite impedance in the case of the non-backscattering state.

The receiving device D_RX, for its part, is configured to:
receive the ambient signal emitted by the source SO, including in particular any reflections and diffractions undergone by the waves of this signal due to elements placed in the environment in which the transmitting D_TX and receiving D_RX devices are located,
receive the backscattered signal coming from the transmitting device D_TX.

For this purpose, and in the present embodiment, said receiving device D_RX is equipped with a receiving antenna (not represented in the figures). For example, said receiving device D_RX is a Smartphone.

It should however be noted that no limitation is attached to the number of antennas with which the receiving device D_RX can be equipped. Furthermore, no limitation is attached to the structural forms that can be taken respectively by the source SO and the receiving device D_RX. By way of non-limiting examples, the following configurations can be envisaged:
the source SO is a Smartphone, and the receiving device D_RX is a base station,
the source SO is a Smartphone, and the receiving device D_RX is also a Smartphone, the source SO is a home gateway (also called "Internet box") emitting a Wi-Fi signal, and the receiving device D_RX is a Smartphone.

As mentioned above, the receiving device D_RX is configured to decode the signal backscattered by the transmitting device D_TX. To this end, it is known that the decoding of the backscattered signal can only be implemented if the electromagnetic power variation, called "power deviation" E_P, received by the receiving device D_RX, between times when the transmitting device D_TX is backscattering and times when it is not backscattering while the source SO is emitting, exceeds a determined threshold, called "power threshold" S_P.

In practice, said power deviation E_P is evaluated according to the following formula:

$$E\_P=|P\_R-P\_NR|.$$

In this formula, P_R (respectively P_NR) corresponds to a measurement of the power received by the receiving device D_RX when the transmitting device D_TX is in the backscattering state (respectively in the non-backscattering state). In other words, P_NR corresponds to a measurement of the power received only because of the waves conveyed by the interfering signal (arrow F_2 in FIG. 1). Thus, a condition according to which the decoding can be implemented is reflected here by E_P>S_P. it is therefore understood that reaching the threshold S_P depends on the deviation between P_R and P_NR.

It should however be noted that although the decoding can be theoretically implemented as soon as E_P>S_P, nothing excludes that a more restrictive decoding condition is imposed on the receiving device D_RX, such as for example E_P>N×S_P where N is a real number strictly greater than 1. The fact of imposing a more restrictive condition allows increasing the quality of communication between the transmitting D_TX and receiving D_RX devices.

Said power threshold S_P is for example defined from a determined decoding error rate as well as from the receiving noise on the receiving device side D_RX. By "decoding error rate", reference is made here to a rate called "BER" (Bit Error Rate). More particularly, studies have shown that said error rate is a decreasing function of the ratio between the deviation E_P and said receiving noise. Consequently, if a BER rate is set, a ratio can be determined between the deviation E_P and said corresponding receiving noise, so that said power threshold S_P then corresponds to the product between this ratio and said receiving noise. Regarding these aspects, those skilled in the art can refer to the document: "Demo Abstract: Real-Time Ambient Backscatter Demonstration", K. Rachedi, D. T. Phan-Huy, N. Selmene, A. Ourir, M. Gautier, A. Gati, A. Galindo-Serrano, R. Fara, J. De Rosny, IEEE INFOCOM 2019 Posters and Demos, 1 May 2019, Paris, France.

Furthermore, the receiving device D_RX also includes acquisition means configured to acquire electromagnetic power measurements. Each of these measurements therefore corresponds to a level of electromagnetic power received by the receiving device D_RX at the time of the acquisitions.

It should be noted that the electromagnetic power measurements can be acquired by the receiving device D_RX regardless of the state (non-backscattering or backscattering state) in which the transmitting device D_TX is located.

Conventionally, said acquisition means include an acquisition chain connected to a sensitive element configured to provide an analog electrical signal representative of the measured electromagnetic power. In the present embodiment, said sensitive element corresponds to the receiving antenna with which the receiving device D_RX is equipped.

Said acquisition chain includes, for example, an acquisition card configured to condition said electrical signal. The conditioning implemented by the acquisition card includes for example, in a manner known per se, an amplification and/or a filtering and/or a current-power conversion. In general, the configuration of such acquisition means is well known to those skilled in the art, and is therefore not detailed here further.

In accordance with the invention, the source SO is associated with a focusing precoder P including a first and a second component for focusing signals respectively towards the transmitting device D_TX and the receiving device D_RX. Within the meaning of the present invention, such signals emitted respectively towards the transmitting D_TX and receiving D_RX devices are part of the ambient signal.

By "focusing precoder", reference is made here to the fact that the source SO is configured to emit, via the use of said focusing precoder, data with high spectral efficiency intended for the transmitting D_TX and receiving D_RX devices. In this way, the source SO is emitting thanks to the formation of beams (also called beamforming) and by using the same radio resources (such as for example the same radio frequencies). Such a focusing precoder is conventionally based on the knowledge, by the source SO, of a propagation channel between the devices D_TX and D_XR.

It should be noted that the focusing precoder P admits, conventionally (and within a transposition), a representation in the form of a matrix P whose:
   the number of lines is equal to the number of antennas with which the source SO is equipped,
   the number of columns is equal to the number of antennas with which the devices belonging to the ambient backscatter communication system 10 are equipped.

Thus, in the present embodiment, the matrix P representing the precoder P includes two columns, a first column (respectively a second column) corresponding to said first component (respectively said second component), and whose coefficients (belonging to the body of the complexes) are representative of the contribution of each antenna of the source SO to the signals transmitted towards the device D_TX (respectively towards the signals transmitted towards the device D_RX).

In a preferred exemplary embodiment of the invention, said precoder P is of the zero forcing (or ZF) type. Such a ZF precoder allows canceling the interference between the transmitting device D_TX and the receiving device D_RX, so as to maximize the Signal-To-Interference ratio (or SIR).

It should however be noted that any focusing precoder P known to those skilled in the art can be implemented, and the choice of a particular precoder P constitutes only one variant of implementation of the invention. For example, the focusing precoder P can be of the Minimum Mean Square Error (MMSE) type. Such an MMSE precoder allows obtaining a compromise between interference cancellation between devices D_TX, D_RX and noise power, so as to maximize the Signal-to-Interference-plus-Noise Ratio (or SINR). Furthermore, said focusing precoder P can be configured so that the signals transmitted respectively towards the transmitting device D_TX and towards the receiving device D_RX are in phase.

Furthermore, and in accordance with the invention, the source SO as well as the transmitting D_TX and receiving D_RX devices are configured to perform processing operations aimed at selecting one or several values representative of said power deviation E_P, each implementing at least part of a selection method as detailed later.

For this purpose, the source SO (respectively the transmitting D_TX/receiving D_RX device) includes for example one or several processors and storage means (magnetic hard disk, electronic memory, optical disk, etc.) in which data and a computer program are stored, in the form of a set of program code instructions to be executed in order to implement, at least partly, said selection method.

Alternatively or in addition, the source SO (respectively the transmitting D_TX/receiving D_RX device) also includes one or several programmable logic circuits, of the FPGA, PLD, etc. type, and/or specialized integrated circuits (ASIC), and/or a set of discrete electronic components, etc. adapted to implement, at least partly, said selection method.

In other words, the source SO (respectively the transmitting D_TX/receiving D_RX device) includes a set of means configured in a software (specific computer program) and/or a hardware (FPGA, PLD, ASIC, etc.) way to implement, at least partly, said selection method.

It should be noted that the programs implemented respectively by the source SO and the transmitting D_TX/receiving D_RX device can also be considered as sub-programs of a program, called "general program", covered by the present invention.

FIG. 2 represents, in the form of a flowchart, the main steps of one mode of implementation of the selection method according to the invention.

As illustrated by FIG. 2, said selection method includes, for a value $\phi\_i$ comprised in the interval $[0, 2\pi]$, a plurality of steps, namely first of all a step E20 of phase-shifting one of the components of the focusing precoder P according to said value $\phi\_i$. Said phase-shift step E20 (also denoted "D_$\phi$ P/$\phi$_i" in FIG. 2) is implemented by the source SO, more particularly by a phase-shift module with which said source SO is equipped.

By "phase-shift of a component", reference is made here to a modification of the phase of a signal emitted by the source SO intended for one of said transmitting D_TX or receiving D_RX devices according to the component considered. In practice, the phase-shift of a component is performed by multiplying the column of the matrix P associated with this component by the complex number number in which "j" corresponds to the complex number whose square (i.e. $j^2$) is equal to $-1$. In other words, the phase-shift of a component of the matrix P corresponds to the fact of applying an angle rotation $\phi\_i$ to this component.

As explained in more detail later, by considering a phase-shift of one of the components of the precoder P, the possibility of varying the power deviation E_P is provided.

For the remainder of the description, it is considered without limitation that the phase-shifted component during said phase-shifting step E20 is the second component of the precoder P (i.e. the component associated with the receiving device D_RX). It should however be specified that the invention is also applicable in the case where the first component of the precoder P is phase-shifted (i.e. the component associated with the transmitting device D_TX), this aspect not constituting a limiting factor of the invention.

Also, at the end of the phase-shift step E20, a precoder Q_i corresponding to the phase-shifted focusing precoder P is obtained. It is noted that the fact of having phase-shifted the precoder P, in order to obtain the precoder Q_i, does not modify the fact that the first and second components of said precoder Q_i allow focusing signals towards respectively the transmitting device D_TX and the receiving device D_RX.

The selection method also includes an emission step E30 using said precoder Q_i. Said emission step E30 (also denoted "EMI SO/Q_i" in FIG. 2) is implemented by the source SO, more particularly by means for emitting the source SO, these emission means including, in particular, the antennas used to emit the ambient signal.

During said emission step E30, the selection method includes a step E40 of acquiring a first measurement MES1_i and a second measurement MES2_i of electromagnetic power. Said acquisition step E40 (also denoted "ACQ MES1_i, MES2_i" in FIG. 2) is implemented by the receiving device D_RX, more particularly by the acquisition means with which said receiving device D_RX is equipped.

More particularly, said first measurement (respectively said second measurement) is acquired when the transmitting device D_TX is in the non-backscattering state (respectively in the backscattering state). It is also obvious that the acquisitions are performed in said working band, since it is in this frequency band that the transmitting device D_TX is compatible with the backscattering source SO, as mentioned above.

In a particular mode of implementation, the transmitting device D_TX is associated with determined and mutually distinct time periods, as well as configured for the backscattering during said time periods. The receiving device D_RX, for its part, is aware of said time periods, and is configured to be synchronized with at least one of these periods, so as to be able to perform at least one electromagnetic power measurement when the transmitting device D_TX is backscattering.

Alternatively, the receiving device D_RX performs acquisitions of power measurements recurrently, for example following a constant time step. In addition, the transmitting device D_TX is able to transmit to the receiving device D_RX a message informing it of the switching from the non-backscattering state to the backscattering state. In this way, a measurement acquired after receiving such a message can be associated with said backscattering state.

Once said first and second measurements have been acquired, the selection method includes a step E50 of determining a value D1_i representative of the power deviation E_P between said first and second measurements. Said determination step E50 (also denoted "DET D1_i" in FIG. 2) is implemented by the receiving device D_RX, more particularly by a determination module with which said receiving device D_RX is equipped. It is noted that said determination module is more generally configured to determine a power deviation between any two electromagnetic power measurements.

In one particular mode of implementation, the value D1_i is determined equal to the power deviation E_P between said first and second measurements.

However, nothing excludes considering another determination of the value D1_i. For example, the value D1_i can be determined equal to a weighting of said deviation E_P, this weighting possibly taking the form of a multiplication coefficient applied to said deviation E_P, such as for example a coefficient corresponding to the ratio between a positive number, for example equal to 2, and the sum of said first and second electromagnetic power measurements.

In general, no limitation is attached to the determination of the value D1_i as long as it is representative of the power deviation E_P between said first and second measurements.

Furthermore, in accordance with the invention, said phase-shift E20, emission E30, acquisition E40 and determination E50 steps are iterated for a plurality of values $\phi\_1, \ldots, \phi\_N$ distinct from each other (N being therefore an integer index strictly greater than 1).

The fact of considering a plurality of values $\phi\_1, \ldots, \phi\_N$ allows obtaining, at the end of said iterations, a plurality of values D1_1, ..., D1_N.

In one particular mode of implementation, said phase-shift E20, emission E30, acquisition E40 and determination E50 steps are iterated as long as the value D1_i determined during a determination step E50 for a value $\phi\_i$ is lower than a predetermined threshold. Proceeding in this way allows limiting the number of iterations, and therefore a fortiori limiting the time devoted to performing said iterations. The computing resources of the receiving device D_RX as well as of the source SO are therefore preserved.

Said predetermined threshold corresponds for example to said power threshold S_P, so as to guarantee that the value $\phi\_i$ considered during the last iteration is associated with a decoding error rate lower than a determined value. However, nothing excludes considering other values for said predetermined threshold, such as for example a multiple of said power threshold S_P, as mentioned previously.

It should be noted that, in this particular mode of implementation, the stopping of the iterations is for example consecutive to the sending of a message by the receiving device D_RX to the source SO when said predetermined threshold has been reached. Such a message includes, for example, information indicating to the source SO that the threshold has been reached, so that said source SO ceases to phase-shift the focusing precoder P.

However, nothing excludes considering a stopping of the iterations implemented differently. For example, a message indicating that the predetermined threshold has been reached is transmitted to an entity other than the source SO, this entity being configured to, in turn, inform the source SO which therefore stops phase-shifting the focusing precoder P. Said other entity is for example a monitoring device able to centralize messages emitted by the receiving device D_RX and to verify the integrity of these messages.

In another particular mode of implementation, said phase-shift E20, emission E30, acquisition E40 and determination E50 steps are iterated a determined number of times. Proceeding in this way offers the possibility of obtaining with certainty as many values D1_i as the number of iterations performed. It is further understood that the greater the number of iterations, the greater the maximum value among the determined values D1_1, ..., D1_N, and therefore the greater the probability that at least one of said values is associated with a deviation E_P greater than the power threshold S_P.

Whatever the particular mode of implementation envisaged (iterations as long as the power threshold is not reached, or a predetermined number of times), said values $\phi\_1, \ldots, \phi\_N$ are for example sampled on a logarithmic scale. According to another example, said values $\phi\_1, \ldots, \phi\_N$ are sampled on a linear scale.

In general, no limitation is attached to the distribution scale of the values $\phi\_1, \ldots, CD\_N$, this aspect not being a limiting factor of the invention.

Preferably, for a considered distribution scale (for example logarithmic or linear scale), each value $\phi\_i$ is strictly less than $\pi/2$.

In addition, and regardless of the particular mode of implementation envisaged, the values $\phi\_1, \ldots, \phi\_N$ preferably include a minimum value equal to 0. More specifically, in the case of the particular mode according to which a predetermined number of iterations is considered, the values $\phi\_1, \ldots, \phi\_N$ also preferably include a maximum value equal to $2\pi-\varepsilon$, where $\varepsilon$ is a parameter chosen to be small so that the values $\phi1, \ldots, \phi\_N$ scan a wide interval included in $[0, 2\pi]$. For example, $\varepsilon$ is equal to 0.1.

Furthermore, the values $\phi\_1, \ldots, \phi\_N$ are for example predetermined and stored by the storage means of the source SO.

Alternatively, the values $\phi\_1, \ldots, \phi\_N$ are stored in a database located on a dedicated server and to which the source SO has access.

According to yet another alternative, the source SO is configured to execute, all at once or recurrently at each iteration, a function of calculation of said values $\phi\_i$, said calculation function being recorded by the storage means of said receiving device D_RX.

Nothing excludes the values $\phi\_1, \ldots, \phi\_N$ from being predetermined or calculated by means of a function of calculation by an entity other than the source SO, such as by the receiving device D_RX, the transmitting device D_TX or another processing device, then transmitted to the source SO.

Once the phase-shift E20, transmission E30, acquisition E40 and determination E50 steps have been iterated, the selection method also includes a step E60 of selecting, by the receiving device, a maximum value called "intermediate optimum value" VOI, among the determined values D1_1, ..., D1_N. Said selection step E60 (also denoted "SELECT VOI=MAX(D1_1, ..., D1_N)" in FIG. 2) is implemented by the receiving device D_RX, more particularly by a selection module with which said receiving device D_RX is equipped. It is noted that said selection module is more generally configured to select a maximum value among a plurality of arbitrary values.

The fact of selecting such an intermediate optimum value VOI thus finally allows identifying a precoder Q_i, among the obtained precoders Q_1, ..., Q_N, maximizing the level of electromagnetic power received by the receiving device D_RX, when the phase-shift of the focusing precoder P is considered to be an optimization variable. The precoder Q_i thus identified can then be used by the source SO for the emission, as detailed later.

The selection of such an intermediate optimum value VOI is carried out in a manner known per se. By way of non-limiting example, a sorting algorithm is applied so as to classify the values D1_1, ..., D1_N in ascending or descending order. Any sorting algorithm known to those skilled in the art can be implemented, and the choice of a particular sorting algorithm constitutes only one variant of implementation of the invention.

The remainder of the description aims to detail two particular modes of implementation of the selection method, in particular modes in which an optimization relating to a power distribution (or power sharing), between the first and second components of the precoder P, is sought, in addition to the optimization detailed above with reference to the phase-shift of said precoder P.

Figure 3:
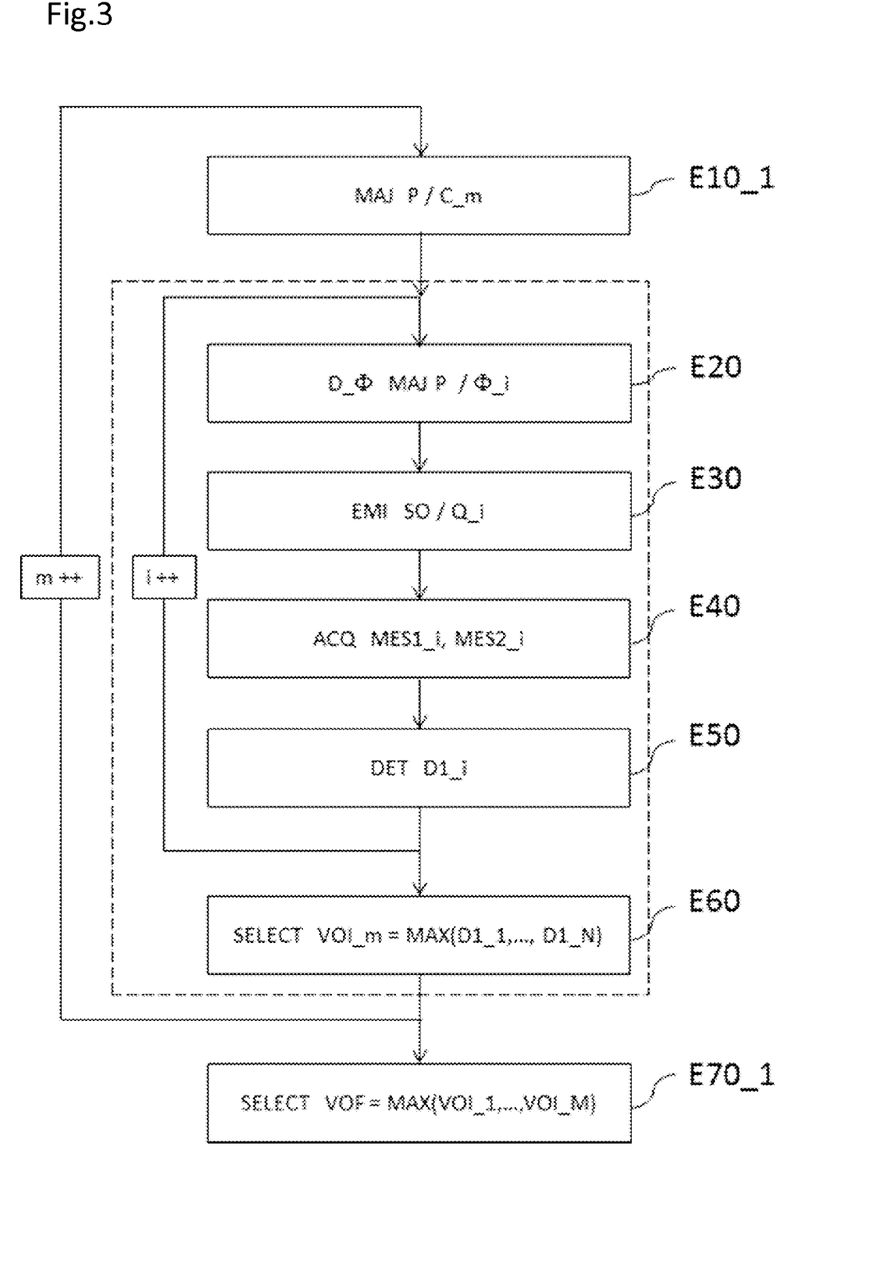
FIG. 3 schematically represents one particular mode of implementation of the selection method of FIG. 2, called "first optimum mode"

FIG. 3 schematically represents a particular mode of implementation of the selection method of FIG. 2, called "first optimum mode".

As illustrated by FIG. 3, the selection method includes, in said first optimum mode, a plurality of steps E10_1 of updating the focusing precoder P, each update step E10_1 (denoted "MAJ P/C_m" in FIG. 3) being implemented before the implementation of the phase-shift E20, emission E30, acquisition E40 and determination E50 steps. Moreover, the set of steps formed of:

the iterations of the phase-shift E20, emission E30, acquisition E40 and determination E50 steps for the values $\phi\_1, \ldots, \phi\_N$, and the step E60 of selecting an intermediate optimum value, is iterated for each of the considered update steps E10_1.

Each update step E10_1 is implemented by the source SO, more particularly by an update module with which said source SO is equipped.

It is understood that each step E10_1 of updating the precoder P corresponds to an intermediate optimum value obtained during the selection step E60 belonging to the set of steps considered for said update step E10_1.

In addition, it should be noted that the phase-shift step E20 implemented during a set of steps is of course applied to the updated precoder P obtained thanks to the update step E10_1 considered for said set of steps. In other words, an updated precoder P corresponds to each update step E10_1, and each updated precoder P (due to the plurality of update steps E10_1) is phase-shifted for each of the values $\phi\_1, \ldots, \phi\_N$. Consequently, for each update step E10_1, N precoder Q_i is obtained from the precoder P updated for said step E10_1, and the power measurements are acquired for each of these precoders Q_i.

More particularly, each step E10_1 of updating the precoder P is implemented so that the updated precoder P corresponds to the precoder P whose first and second components are weighted respectively by strictly positive first coefficient and second coefficient. Said first and second coefficients considered during a step E10_1 form a pair of coefficients C_m (m being an integer index greater than or equal to 1).

Furthermore, the pairs of first and second coefficients considered during said update steps E10_1 are distinct from each other. VOI_m denotes the intermediate optimum value obtained for a step E10_1 associated with a pair C_m.

Thus, it is understood that an update of the precoder P amounts to multiplying the first column (respectively the second column) of the matrix P by said first coefficient (respectively by said second coefficient) considered for this update.

It is also understood that by performing such an update of the precoder P, the distribution of electromagnetic power transmitted by the source SO is modified (due to the use of said updated precoder P) towards each of the transmitting D_TX and receiving D_RX devices.

For example, the first coefficient is equal to a value $\delta$, where $\delta$ is chosen from the interval $]0,1[$, and the second coefficient is equal to $\sqrt{1-\delta^2}$. According to this example, the power transmitted towards the transmitting device D_TX is multiplied by $\delta^2$ while the power transmitted towards the receiving device D_RX is multiplied by $1-\delta^2$.

However, nothing excludes considering other values for said first and second coefficients. In general, no limitation is attached to the choice of said first and second coefficients as long as they are both strictly positive.

According to dispositions similar to those mentioned above for the number of values $\phi\_1, \ldots, \phi\_N$ to be considered, the number of update steps E10_1 is for example determined.

According to another example, said set of steps is iterated as long as the optimum intermediate value VOI_m selected during a selection step E60 is below a predetermined threshold. The number of update steps E10_1 is then equal to the number of iterations performed to reach said predetermined threshold. Said predetermined threshold corresponds for example to said power threshold S_P. However, nothing excludes considering other values for said predetermined threshold, such as for example a multiple of said power threshold S_P, as mentioned previously.

For the remainder of the description, M denotes the number of iterations of step E10_1. Consequently, M pairs C_1, ..., C_M are considered.

Moreover, once said set of steps has been iterated for each of the update steps E10_1, the selection method also includes a step E70_1 of selecting a maximum value, called "final optimum value" VOF, among the intermediate optimum values VOI_1, ..., VOI_M which have been obtained as a result of said iterations.

The fact of selecting such a final optimum value VOF therefore ultimately allows identifying a precoder, among all the precoders obtained following the phase-shift steps E20 which are implemented (due to the plurality of update steps E10_1 considered as well as the different values $\phi\_1, \ldots, \phi\_N$ considered), maximizing the level of electromagnetic power received by the receiving device D_RX. It is important to note that in said first optimum mode, the phase-shift of an updated precoder P is considered to be an optimization variable, but that the update itself of the precoder P (via said pairs C_1, ..., C_M of first and second coefficients) is also considered to be an optimization variable. In other words, said first optimum mode includes two optimization loops, a first optimization loop relating to the phase-shift values $\phi\_1, \ldots, \phi\_N$ and which is included in an optimization loop relating for its part to the weighting of the first and second components of the focusing precoder P.

The precoder thus identified, thanks to the implementation of the first optimum mode, can then be used by the source SO for emission, as detailed later.

According to dispositions similar to those mentioned above for the selection of an intermediate optimum value, the selection of such a final optimum value VOF is made in a manner known per se. By way of non-limiting example, a sorting algorithm is applied so as to classify all the intermediate optimum values VOI_1, ..., VOI_M obtained in ascending or descending order. Any sorting algorithm known to those skilled in the art can be implemented, and the choice of a particular sorting algorithm constitutes only one variant of implementation of the invention.

The following explains the theoretical mathematical framework that allows modeling and implementing numerically, in particular, the different steps of said first optimum mode. In order to simplify the presentation of this theoretical framework, it is considered without limitation that the focusing precoder P is of the ZF type (i.e. zero forcing).

In addition, the notation according to which the term positioned in line p and column q of a matrix M is written $M_{p,q}$ as well as the notation according to which the term in position p of a vector v is written $v_p$, are adopted. Finally, the real part of a complex number z is denoted $\Re(z)$.

$K \in \mathbb{N}$ refers to the number of antennas of the source;

$h^{SR} \in \mathbb{C}^{K \times 1}$ refers to the vector including the direct propagation channel between each antenna K (K being an index varying between 1 and K) of the source SO and the antenna of the receiving device D_RX;

$h^{STR} \in \mathbb{C}^{K \times 1}$ refers to the vector including the propagation channel between each antenna K of the source SO and the antenna of the receiving device D_RX, after backscattering by the transmitting device D_TX, and taking into account only the signal backscattered by said transmitting device D_TX (i.e. not taking account $h^{SR}$);

$h^{ST} \in \mathbb{C}^{K \times 1}$ refers to the vector including the propagation channel between each antenna K of the source SO and the antenna of the transmitting device D_TX;

$h^{TR} \in \mathbb{C}$ refers to the propagation channel between the antenna of the transmitting device D_TX and the antenna of the receiving device D_RX;

$H \in \mathbb{C}^{2 \times K}$ refers to the complex matrix such that $H_{1,k} = h_k^{ST}$ and $H_{2,k} = h_k^{SR}$, said matrix H being representative of a global propagation channel between the source SO and the transmitting D_TX and receiving D_RX devices, without taking into account the signal backscattered by said transmitting device D_TX. Insofar as the source SO is associated with the focusing precoder P, said source SO has knowledge of said matrix H.

From these notations, it is possible to write the following relation: $h_k^{STR} = h_k^{ST} h^{TR}$. In addition, the following relations are also obtained:

when the transmitting device D_TX is in the non-backscattering state, the full propagation channel $h_k^{trans}$ between the antenna K of the source SO and the antenna of the receiving device D_RX is equal to $h_k^{SR}$;

when the transmitting device D_TX is in the backscattering state, the full propagation channel $h_k^{diff}$ between the antenna K of the source SO and the antenna of the receiving device D_RX is equal to $h_k^{STR} + h_k^{SR}$.

Considering the notations introduced, the matrix $P \in \mathbb{C}^{K \times 2}$ representing the precoder P verifies the following relation:

$$P = H^\dagger (HH^\dagger)^{-1},$$

relation in which † corresponds to the conjugate transpose operator. It is noted that given the writing of P, HP corresponds to the identity matrix.

The following notations are also introduced:

$$-\Gamma^{(m)} = \begin{bmatrix} \delta^{(m)} & 0 \\ 0 & \sqrt{1-(\delta^{(m)})^2} \end{bmatrix}$$

refers to a power sharing (or power distribution) matrix used during a step E10_1 for updating the precoder P, and in which $\delta^{(m)}$ is comprised in the interval $]0,1[$. A power sharing matrix, and therefore also a step E10_1 of updating the precoder P, corresponds to each index m set. By way of illustration, three sharing matrices $\Gamma^{(1)}$, $\Gamma^{(2)}$, $\Gamma^{(3)}$ are used, and they are respectively determined for $\delta^{(1)} = 0.3$, $\delta^{(2)} = 0.6$ and $\delta^{(3)} = 0.9$;

$$-D^{(i)} = \begin{bmatrix} 1 & 0 \\ 0 & e^{j\Phi_{-i}} \end{bmatrix}$$

refers to a phase-shift matrix used during a phase-shift step E20, and in which $\phi_i$ is comprised in the interval $[0, 2\pi]$. A phase-shift matrix corresponds to each index i set. For illustrative purposes, six phase-shift matrices $D^{(1)}$, $D^{(2)}$, $D^{(3)}$, $D^{(4)}$, $D^{(5)}$, $D^{(6)}$ are used, and they are respectively determined for $\phi_1 = 0$, $\Phi_2 = \pi/6$, $\Phi_3 = \pi/3$, $\Phi_4 = \pi/2$, $\Phi_5 = 2\pi/3$ and $\Phi_6 = 5\pi/6$;

$S^{(i,m)} \in \mathbb{C}^{K \times 2}$ refers to a precoding matrix satisfying $S^{(i,m)} = \alpha^{(i,m)} P \Gamma^{(m)} D^{(i)} = \alpha^{(i,m)} P D^{(i)} \Gamma^{(m)}$. In this expression, the factor $\alpha^{(i,m)}$ is a factor called "normalization" factor whose value is determined so that the precoding matrix $S^{(i,m)}$ is unitary, i.e. so that $$\Sigma_{l=1}^2 \Sigma_{k=1}^K |S_{k,l}^{(i,m)}|^2 = \Sigma_{k=1}^K |S_{k,1}^{(i,m)}|^2 + \Sigma_{k=1}^K |S_{k,2}^{(i,m)}|^2 = 1.$$

In this last expression, $S_{k,1}^{(i,m)} = \alpha^{(i,m)} \delta^{(m)} P_{k,1}$ is obtained as well as $S_{k,2}^{(i,m)} = \alpha^{(i,m)} \sqrt{1-(\delta^{(m)})^2} e^{j\Phi_{-i}} P_{k,2}$, so that $\alpha^{(i,m)}$ is determined by the following expression:

$$\alpha^{(i,m)} = \frac{1}{\sqrt{(\delta^{(m)})^2 \sum_{k=1}^K |P_{k,1}|^2 + (1-(\delta^{(m)})^2) \sum_{k=1}^K |P_{k,2}|^2}}.$$

It should also be noted that said precoder Q_i, obtained during a phase-shift step E20, here admits, with regard to the notations introduced, the matrix representation $PD^{(i)}$.

$G^{(i,m)} = HS^{(i,m)} \in \mathbb{C}^{2 \times 2}$ also denotes the matrix representative of an equivalent channel between the source SO and the transmitting D_TX and receiving D_RX devices when said source SO is emitting using the precoder whose associated matrix is $S^{(i,m)}$. With regard to the notations introduced previously, the following relations are obtained:

$$G^{(i,m)} = \alpha^{(i,m)} \Gamma^{(m)} D^{(i)} = \begin{bmatrix} \alpha^{(i,m)} \delta^{(m)} & 0 \\ 0 & \alpha^{(i,m)} \sqrt{1-(\delta^{(m)})^2} e^{j\Phi_{-i}} \end{bmatrix}.$$

Also, and initially, consider the case where the transmitting device D_TX is in the non-backscattering state (the signal received in this case therefore corresponds only to the interfering signal routed directly between the source SO and said receiving device D_RX). Therefore, with regard to the expression of the matrix $G^{(i,m)}$, the receiving device D_RX receives a signal $s^{trans} = \alpha^{(i,m)} \sqrt{1-(\delta^{(m)})^2} e^{j\Phi_{-i}}$ whose associated power is:

$$p^{trans} = |s^{trans}|^2 = (\alpha^{(i,m)})^2 (1-(\delta^{(m)})^2).$$

Secondly, consider now the case where the transmitting device D_TX is in the backscattering state. Therefore, the receiving device D_RX receives a signal $s^{diff} = \alpha^{(i,m)} \delta^{(m)} h^{TR} + \alpha^{(i,m)} \sqrt{1-(\delta^{(m)})^2} e^{j\Phi_{-i}}$ whose associated power is:

$$p^{diff} = |s^{diff}|^2 = (\alpha^{(i,m)} \delta^{(m)})^2 |h^{TR}|^2 + (\alpha^{(i,m)})^2 (1-(\delta^{(m)})^2) + 2 (\alpha^{(i,m)})^2 \delta^{m} \sqrt{1-(\delta^m)^2} \Re(H^{TR} e^{-j\Phi_{-i}}).$$

Consequently, the power deviation E_P between the powers corresponding to these two cases is given by:

$$E\_P = |p^{diff} - p^{trans}| = |(\alpha^{(i,m)} \delta^{(m)})^2 |h^{TR}|^2 + 2(\alpha^{(i,m)})^2 \delta^m \sqrt{1-(\delta^m)^2} \Re(h^{TR} e^{-j\Phi_{-i}})|.$$

For an index m set (i.e. for an update step E10_1), said power deviation E_P is maximized when the phase $\phi_i$ compensates for the phase of $h^{TR}$, i.e. when:

$$h^{TR} e^{-j\Phi_{-i}} = |h^{TR}|.$$

Thus, an intermediate optimum value is obtained at m set for the value $\phi_i$ maximizing the quantity E_P whose expression is given above.

Let i*(m) denote the index among by the indices i=1, ..., N, such that for an index m set, an intermediate optimum value is obtained for the value $\phi_i*(m)$. The index m having been set so far, it is still possible to maximize E_P by considering the different values taken by the coefficient $\delta^m$ as a function of the index m.

Let m* denote the index such that a final optimum value VOF is obtained with the coefficient $\delta^{m*}$. Ultimately, it results from the preceding considerations that the precoder making it possible to maximize the power deviation E_P, and therefore in fine to maximize the level of electromagnetic power received by the receiving device D_RX, is the precoder whose associated matrix is $S^{(i^*(m^*), m^*)}$.

It emerges from the elements explained above for said mathematical theoretical framework that the optimizations relating respectively to the phase-shift and to the power distribution of the precoder P can be implemented in an order which differs from the one envisaged for said first optimum mode.

Figure 4:
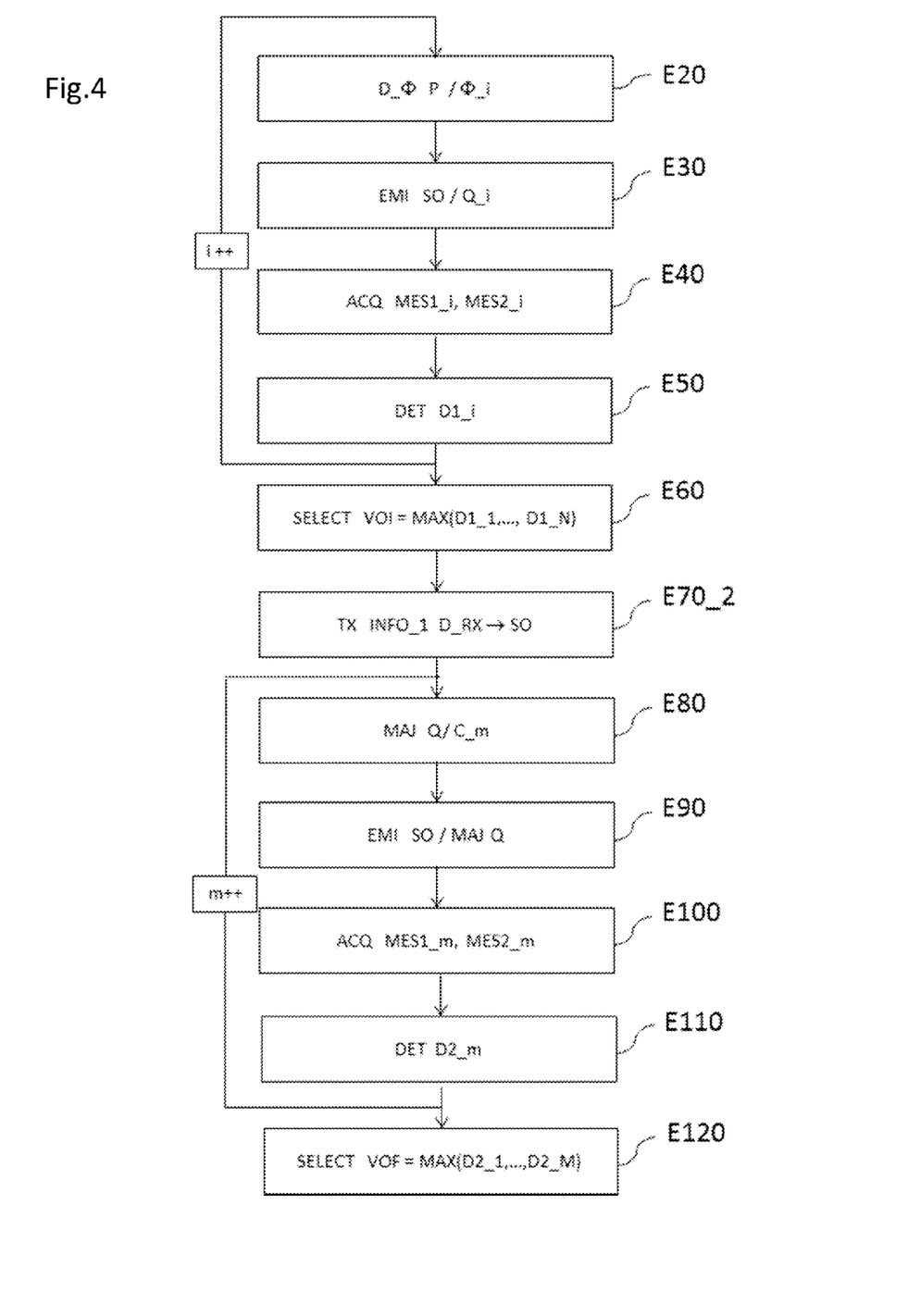
FIG. 4 schematically represents one particular mode of implementation of the selection method of FIG. 2, called "second optimum mode"

To this end, FIG. 4 schematically represents one particular mode of implementation of the selection method of FIG. 2, called "second optimum mode".

Said second optimum mode corresponds to one particular mode of implementation in which the power deviation E_P is maximized by again considering the values $\phi\_1, \ldots, \phi\_N$ as well as the pairs C_1, . . . , C_M formed of said first and second coefficients as optimization variables. However, said second optimum mode differs from the first optimum mode in that the order in which said optimization variables are considered is modified. More particularly, in said second optimum mode, and as detailed below, a first optimization is first carried out according to the values $\phi\_1, \ldots, \phi\_N$. Then, based on this first optimization, a second optimization is then carried out according to the pairs C_1, . . . , C_M. Thus, unlike said first optimum mode, said second optimum mode includes two optimization loops which are not included in each other, but are implemented in series.

It is important to note that the elements explained above for said mathematical theoretical framework remain valid for said second optimum mode, within a few modifications. Those skilled in the art know how to implement these modifications without difficulty. More particularly, they know how to model said second optimum mode from identical or similar mathematical objects (phase-shift matrix, power sharing matrix, normalized matrix, product of matrices, etc.).

As illustrated by FIG. 4, the selection method follows steps E20 to E60 as described above with reference to FIG. 2. It includes, in said second optimum mode, after step E60 of selecting said intermediate optimum value VOI, a step E70_2 of transmitting, by the receiving device D_RX and towards the source SO, information INFO_1 identifying the precoder, called "intermediate optimum precoder" Q, based on which said intermediate optimum value VOI was determined. Said transmission step E70_2 (also denoted "TX INFO_1 D_RX→SO" in FIG. 4) is implemented by the receiving device D_RX, more particularly by a transmission module with which said receiving device D_RX is equipped.

It is therefore understood that said intermediate optimum precoder Q corresponds to one of the precoders Q_1, . . . , Q_N obtained following the iterations of the phase-shift steps E20.

In one particular exemplary implementation, said precoders Q_1, . . . , Q_N are stored by the source SO as they are obtained, as well as grouped within a list. Furthermore, said information INFO_1 is representative of the position (or even of the index), within this list, of the precoder Q_i corresponding to said intermediate optimum precoder Q.

For example, and more specifically, an index counter is incremented by the receiving device D_RX at each iteration of the phase-shift E20, emission E30, acquisition E40 and determination E50 steps. Said information INFO_1 then corresponds to the index of said counter associated with the iteration during which said intermediate optimum value was determined.

In general, no limitation is attached to the form of the information INFO_1 transmitted to the source SO as long as the latter is able to allow the identification of said intermediate optimum precoder Q. In addition, the transmission of said information INFO_1 is for example contained in a message, for example a message defined in a telecommunications standard.

The selection method further includes, for a pair C_m of first and second strictly positive coefficients, a plurality of steps, namely initially a step E80 of updating, by the source SO, the precoder Q. The updated Q precoder corresponds to the precoder Q whose first and second components are weighted by respectively said first and second coefficients.

The implementation of said step 80 (also denoted "MAJ Q/C_m" in FIG. 4) is similar to that of step E10_1 mentioned previously within the framework of the first optimum mode, except that said step 80 here concerns the precoder Q and not the precoder P. The technical characteristics mentioned with reference to step E10_1, and relating to the matrix implementation of such a step as well as to the possible values of said first and second coefficients, still apply here.

The selection method also includes a step E90 of emission, by the source SO, using said updated precoder Q. The implementation of said emission step E90 (also denoted "EMI SO/MAJ Q" in FIG. 4) is similar to that of step E30 described previously.

During said emission step E90, the selection method includes a step E100 of acquiring, by the receiving device D_RX, a first measurement MES1_m and a second measurement MES2_m of electromagnetic power when the transmitting device is respectively in a non-backscattering state and a backscattering state. The implementation of said acquisition step E100 (also denoted "ACQ MES1_m, MES2_m" in FIG. 4) is similar to that of step E40 described previously.

Once said first and second measurements have been acquired, the selection method includes a step E110 of determining, by the receiving device D_RX, a value D2_m representative of the power deviation E_P. The implementation of said determination step E110 (also denoted "DET D2_m" in FIG. 4) is similar to that of step E50 described previously, except that a value D2_m, and not a value D1_i, is determined here.

Furthermore, in said second optimum mode, said update E80, emission E90, acquisition E100 and determination E110 steps are iterated for said plurality of pairs C_1, . . . , C_M distinct from each other.

The fact of considering a plurality of pairs C_1, . . . , C_M allows obtaining, at the end of said iterations, a plurality of values D2_1, . . . , D2_M.

Once the update E80, emission E90, acquisition E100 and determination E110 steps have been iterated, the selection method includes a step 120 of selecting, by the receiving device D_RX, a maximum value, called "final optimum value" VOF, among the determined values D2_1, . . . , D2_M. The implementation of said selection step E120 (also denoted "SELECT VOF=MAX(D2_1, . . . , D2_M" in FIG. 4) is similar to that of step E70_1 described previously.

It should be noted that the invention has been described so far by considering a plurality of steps of updating a precoder (steps E10_1 for the first optimum mode and for the precoder P, as well as steps 80 for the second optimum mode and the precoder Q), and also considering that these update steps were part of an optimization loop. However, and as regards more particularly said first optimum mode, the invention remains applicable to the case where a single step of updating the precoder P is implemented. In other words, in this particular case, only an optimization loop is carried out with respect to the phase-shift values $\phi\_1, \ldots, \phi\_N$.

Nevertheless, the fact of having an update of the precoder P before the implementation of such an optimization loop maintains the possibility of modifying the distribution of electromagnetic power transmitted by the source SO towards each of the transmitting D_TX and receiving D_RX devices, for example based on external information concerning the propagation environment of the communication system 10. Such external information relates, for example, to a substantial modification of said propagation environment (one or several moved objects, etc.), so that the focusing precoder P is advantageously updated to take into account the modification of the propagation channel separating the source SO from the devices D_TX, D_RX. As a consequence of such an update of the precoder P, the results obtained at the end of the optimization loop relating to the values $\phi\_1, \ldots, \phi\_N$ are more relevant.

It should be noted that the invention has been described so far considering that the transmitting device D_TX was associated with a single backscattering state as well as a single non-backscattering state. The invention nevertheless remains applicable in the case where the transmitting device D_TX is associated with a plurality of backscattering states, these states being distinct from each other in that they are implemented thanks to respective impedances distinct from each other. In this case, it should be understood that a single backscattering state is considered among all of said backscattering states when acquisition steps of the selection method are executed. In other words, whatever the referred acquisition step, the considered backscattering state remains identical.

Furthermore, and according to another aspect, the invention also relates to a method for communication by ambient backscatter between the transmitting device D_TX and the receiving device D_RX.

Figure 5:
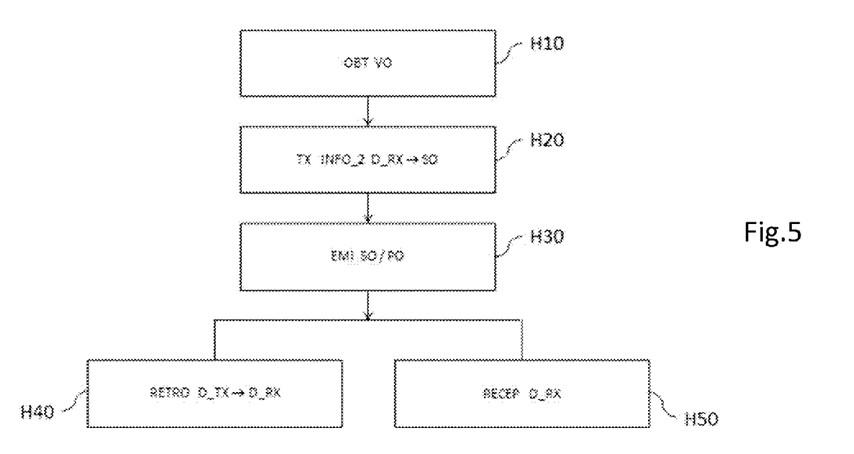
FIG. 5 represents, in the form of a flowchart, the main steps of a communication method according to the invention.

FIG. 5 represents, in the form of a flowchart, the main steps of the communication method according to the invention. Said communication method is implemented by the communication system 10 according to the invention, and detailed below, by way of illustration, with reference to the system 10 described previously (FIG. 1).

As illustrated in FIG. 5, the communication method initially includes a step H10 of obtaining an optimum value VO (also denoted "OBT VO" in FIG. 5).

In one particular mode of implementation, said optimum value VO corresponds to an intermediate optimum value obtained, by selection, as described above within the framework of the selection method. Thus, it may be an intermediate optimum value obtained while:
 only an optimization loop relating to the values $\phi\_1, \ldots, \phi\_N$ is considered, or
 an optimization loop on the values $\phi\_1, \ldots, \phi\_N$ and an optimization loop relating to the pairs of coefficients $C\_1, \ldots, C\_M$ are considered. More particularly, when several intermediate optimum values are obtained (case of the first optimum mode), the referenced optimum value for said step H10 corresponds for example to any one of said intermediate optimum values.

In another particular mode of implementation, said optimum value corresponds to a final optimum value obtained, by selection, as described above within the framework of the selection method.

Once said optimum value has been obtained, the communication method includes a step H20 of transmitting, by the receiving device D_RX and towards the source SO, information INFO_2 identifying the precoder, called "optimized precoder" PO, based on which said intermediate optimum value/final optimum value was determined. Said transmission step H20 (also denoted "TX INFO_2 D_RX→SO" in FIG. 5) is implemented thanks to the transmission module already mentioned before and with which said receiving device D_RX is equipped.

The characteristics mentioned above with reference to the information INFO_1 (information representative of a position in a list, information corresponding to the index of a counter, indifference as to the form of the information, transmission via a message such as for example a message defined in a telecommunications standard) still apply here with regard to the information INFO_2.

Once said information INFO_2 has been transmitted to the source SO, the communication method includes a step H30 of emitting (still denoted "EMI SO/PO" in FIG. 5), by said source SO, an ambient signal using the optimized precoder PO identified by said INFO_2.

Consequently, the communication method includes a step H40 of backscattering (also denoted "RETRO D_TX→D_RX" in FIG. 5), by the transmitting device D_TX, the ambient signal emitted by the source SO (i.e. the transmitting device D_TX switches from the non-backscattering state to the backscattering state if it was not already in that state before). In practice, the transmitting device D_TX backscatters the signal that the source SO focuses towards it using said optimized precoder PO.

The communication method also includes a step H50 of receiving (also denoted "RECEP D_RX" in FIG. 5), by the receiving device D_RX, the ambient signal backscattered by the transmitting device D_TX.

In a particular mode of implementation (not represented in FIG. 5), said obtaining H10, transmission H20, emission H30, backscatter H40 and receiving H50 steps are iterated recurrently.

The fact of carrying out these steps recurrently allows taking into account the variability of the environment in which the transmitting device D_TX and the receiving device D_RX are positioned.

For example, said steps are iterated periodically, for example once a day in an environment in which the power distribution generated by the source SO is stable, or even more, for example once every hour if the power distribution is capable of changing substantially every hour.

Finally, with regard to the respective positions of the transmitting device D_TX and of the receiving device D_RX in the environment of the communication system 10, several exemplary embodiments can be envisaged.

For example, said positions are arbitrary in said environment.

According to another exemplary embodiment, said positions are advantageously determined, during the selection method, during a step prior to any phase-shift or update of a precoder. More particularly, in this exemplary embodiment, said positions are determined using one or two terminals, such as for example smart cellular phones, able to exchange data (pilot sequences) with the source SO so that the latter can estimate, by reciprocity, the propagation channel(s) separating it from said terminals. Based on the knowledge of these channels, said source SO determines the focusing precoder P, said precoder P being configured to generate, in said environment, areas in which the transmitting D_TX and receiving D_RX devices are positioned. Such an implementation is for example described in the patent application associated with the filing number FR1908917 and entitled "Method for generating at least one area for the backscattering of an ambient signal and/or for the receipt of a backscattered ambient signal", hose content is integrated herein by reference.

Although the present disclosure has been described with reference to one or more examples, workers skilled in the art will recognize that changes may be made in form and detail without departing from the scope of the disclosure and/or the appended claims.

The invention claimed is:

1. A method implemented by an ambient backscatter communication system including an emitting source as well as a transmitting device and a receiving device, the source being associated with a focusing precoder P including a first and a second component for focusing signals towards respectively the transmitting device and the receiving device, said method including, for a value $\Phi\_i$ comprised in the interval $[0, 2\pi]$:

phase-shifting, by the source, one of the components of the precoder P according to said value $\Phi\_i$, so as to obtain a precoder $Q\_i$, emission, by the source, using said precoder $Q\_i$, acquiring, by the receiving device, a first measurement and a second measurement of electromagnetic power when the transmitting device is respectively in a non-backscattering state and in a backscattering state, determining, by the receiving device, a value $D1\_i$ representative of a power deviation, in absolute value, between said first and second measurements, said phase-shift, emission, acquisition and determination being iterated for a plurality of values $\Phi\_1, \ldots, \Phi\_N$ distinct from each other, the method further including selecting, by the receiving device, a maximum value, called intermediate optimum value, among the determined values $D1\_1, \ldots, D1\_N$.

2. The method according to claim 1, wherein said phase-shift, emission, acquisition and determination steps are iterated as long as the value $D1\_i$ determined during a determination step for a value $\Phi\_i$ is lower than a predetermined threshold.

3. The method according to claim 1, wherein said phase-shift, emission, acquisition and determination are iterated a determined number of times.

4. The method according to claim 1, wherein the values $\Phi\_1, \ldots, \Phi\_N$ are sampled on a logarithmic scale or alternatively on a linear scale.

5. The method according to claim 1, wherein the precoder P is of a zero forcing type or of a Minimum Mean Square Error type.

6. The method according to claim 1, said method further including, before the implementation of the phase-shift, emission, acquisition and determination, at least one act of updating, by the source, the precoder P, the updated precoder P corresponding to the precoder P whose first and second components are weighted respectively by strictly positive first coefficient and second coefficient forming a pair of coefficients, and the phase-shift being applied to said updated precoder P.

7. The method according to claim 6, comprising performing a plurality of the update acts, the pairs of first and second coefficients considered during said update acts being distinct from each other, wherein:

the iterations of the phase-shift, emission, acquisition and determination for the values $\Phi\_1, \ldots, \Phi\_N$, and the selecting an intermediate optimum value, are iterated for each of the update acts, so that each update act corresponds to an intermediate optimum value, said method further including selecting, by the receiving device, a maximum value, called final optimum value, among said intermediate optimum values.

8. The method according to claim 6, wherein, for a given update, the first coefficient is equal to a value $\delta$, where $\delta$ is chosen from the interval $]0,1[$, and the second coefficient is equal to $\sqrt{1-\delta^2}$.

9. The method according to claim 1, said method including, after the of selecting said intermediate optimum value, transmitting, by the receiving device and towards the source, information identifying the precoder, called intermediate optimum precoder Q, based on which said intermediate optimum value was determined, said method further including, for a pair of first and second strictly positive coefficients:

updating, by the source, the precoder Q, the updated precoder Q corresponding to the precoder Q whose first and second components are weighted by said first and second coefficients respectively, emission, by the source, using said updated precoder Q, acquiring, by the receiving device, a first measurement and a second measurement of electromagnetic power when the transmitting device is respectively in a non-backscattering state and in a backscattering state, and determining, by the receiving device, a value $D2\_m$ representative of a power deviation, in absolute value, between said measurements, said update, emission, acquisition and determination performed for a pair of coefficients being iterated for a plurality of pairs of coefficients distinct from each other, the method further including selecting, by the receiving device, a maximum value, called final optimum value, among the determined values $D2\_1, \ldots, D2\_M$.

10. The method according to claim 9, including:

obtaining the intermediate optimum value selected among the determined values $D1\_1, \ldots, D1\_N$, or the final optimum value selected, among the determined values $D2\_1, \ldots, D2\_M$, transmitting, by the receiving device and towards the source, information identifying the precoder, called optimized precoder, based on which said intermediate optimum value or said final optimum value was obtained, emitting, by the source, an ambient signal using said optimized precoder, backscattering, by the transmitting device, said ambient signal, receiving, by the receiving device, the backscattered ambient signal.

11. A non-transitory computer readable medium having stored thereon instructions which, when executed by a processor, cause the processor to implement of at least part of a selection method according to claim 1.

12. An ambient backscatter communication system including:

an emitting source;

a transmitting device; and a receiving device, the source being associated with a focusing precoder P including a first and a second component for focusing signals towards respectively the transmitting device and the receiving device, said source including:
- at least one first processor; and
- at least one first non-transitory computer-readable medium comprising instructions stored thereon which when executed by the at least one first processor configure the source to:
  - phase-shift, for a value $\Phi\_i$ comprised in the interval $[0, 2\pi]$, one of the components of the precoder P according to said value $\Phi\_i$, so as to obtain a precoder $Q\_i$,
  - emit using said precoder $Q\_i$, and said receiving device including:
- at least one second processor; and
- at least one second non-transitory computer-readable medium comprising instructions stored thereon which when executed by the at least one second processor configure the receiving to:
  - acquire electromagnetic power measurements when the transmitting device is respectively in a non-backscattering state and in a backscattering state,
  - determine, from two acquired measurements, a value representative of a power deviation between said two acquired measurements,
  - select, when several values have been determined, a maximum value among said determined values.

13. The system according to claim 12, the receiving device further including a transmitter, configured to transmit towards the source information identifying a precoder based on which said maximum value was determined.

* * * * *